United States Patent
Kim et al.

(10) Patent No.: US 11,790,085 B2
(45) Date of Patent: Oct. 17, 2023

(54) APPARATUS FOR DETECTING UNKNOWN MALWARE USING VARIABLE OPCODE SEQUENCE AND METHOD USING THE SAME

(71) Applicant: Electronics and Telecommunications Research Institute, Daejeon (KR)

(72) Inventors: Jung-Tae Kim, Daejeon (KR);
Ji-Hyeon Song, Daejeon (KR);
Jong-Hyun Kim, Daejeon (KR);
Sang-Min Lee, Daejeon (KR);
Ik-Kyun Kim, Daejeon (KR);
Dae-Sung Moon, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 178 days.

(21) Appl. No.: 17/461,337

(22) Filed: Aug. 30, 2021

(65) Prior Publication Data
US 2022/0138319 A1 May 5, 2022

(30) Foreign Application Priority Data

Oct. 29, 2020 (KR) .................. 10-2020-0142203
May 11, 2021 (KR) .................. 10-2021-0060608

(51) Int. Cl.
*G06F 21/56* (2013.01)
*G06N 20/00* (2019.01)

(52) U.S. Cl.
CPC .......... *G06F 21/564* (2013.01); *G06N 20/00* (2019.01)

(58) Field of Classification Search
CPC ....................................................... G06F 21/56
See application file for complete search history.

(56) References Cited

U.S. PATENT DOCUMENTS 9,361,458 B1* 6/2016 Feng ................... G06F 21/564
9,800,879 B2* 10/2017 Das ....................... H04N 19/467
10,235,176 B2* 3/2019 DeHon ................ G06F 9/30072
(Continued)

FOREIGN PATENT DOCUMENTS

KR 101432429 B1 8/2014
KR 101863615 B1 6/2018
(Continued)

OTHER PUBLICATIONS

Hyo-Kyung Choi et al., Development of Vaccine with Artificial Intelligence: By Analyzing OP Code Features Based on Text and Image Dataset, Journal of The Korea Institute of Information Security & Cryptology, vol. 29, No. 5, Oct. 2019, ISSN 1598-3986(Print), ISSN 2288-2715(Online), pp. 1019-1026.
(Continued)

*Primary Examiner* — Viral S Lakhia
(74) *Attorney, Agent, or Firm* — William Park & Associates LTD.

(57) ABSTRACT

Disclosed herein are an apparatus for detecting unknown malware using a variable-length operation code (opcode) and a method using the apparatus. The method includes collecting opcode information from a detection target, generating a multi-pixel image having a variable length by performing feature engineering on the opcode information; and detecting unknown malware by inputting the multi-pixel image to a deep-learning model based on AI.

16 Claims, 11 Drawing Sheets

(56) References Cited

U.S. PATENT DOCUMENTS

| | | | |
|---|---|---|---|
| 10,572,252 B2* | 2/2020 | Barry | G06F 9/30032 |
| 10,817,606 B1* | 10/2020 | Vincent | G06F 9/45558 |
| 10,831,478 B2* | 11/2020 | Giamei | G06F 9/30032 |
| 10,872,270 B2 | 12/2020 | Kim et al. | |
| 11,379,581 B2* | 7/2022 | Chistyakov | G06F 21/56 |
| 11,461,467 B2* | 10/2022 | Saffar | G06F 21/563 |
| 11,550,911 B2* | 1/2023 | Kutt | G06F 8/75 |
| 11,615,523 B2* | 3/2023 | Wang | G06V 10/82 |
| | | | 382/103 |
| 2015/0188936 A1 | 7/2015 | Kim et al. | |
| 2017/0270299 A1 | 9/2017 | Kim et al. | |
| 2019/0042743 A1* | 2/2019 | Chen | G06N 20/00 |
| 2019/0163904 A1 | 5/2019 | Chung et al. | |
| 2020/0364338 A1* | 11/2020 | Ducau | G06F 21/563 |

FOREIGN PATENT DOCUMENTS

| | | | |
|---|---|---|---|
| KR | 101880686 B1 | 7/2018 | |
| KR | 102007809 B1 | 8/2019 | |
| KR | 1020200076845 A | 6/2020 | |
| KR | 102144914 B1 | 8/2020 | |
| KR | 102177203 B1 | 11/2020 | |

OTHER PUBLICATIONS

Sang Ni et al., Malware identification using visualization images and deep learning, Computers & Security 000 (2018) 1-15, Elsevier Ltd., Apr. 2018.

* cited by examiner

| pFile | Raw Data | Value |
|---|---|---|
| 00000400 | 55 8B EC 81 EC 84 00 00 00 A1 00 30 40 00 33 C5 | U..........0@.3. |
| 00000410 | 89 45 FC 33 C0 EB 09 8D A4 24 00 00 00 00 8B FF | .E.3.....$......|
| 00000420 | 8A 88 18 30 40 00 88 8C 05 7C FF FF FF 40 84 C9 | ...0@....\|...@.. |
| 00000430 | 75 EE 8D 85 7C FF FF FF 50 68 F4 20 40 00 FF 15 | u...\|...Ph. @... |
| 00000440 | A0 20 40 00 8B 4D FC 33 CD 83 C4 08 33 C0 E8 04 | . @..M.3....3... |
| 00000450 | 00 00 00 8B E5 5D C3 3B 00 00 00 00 40 00 75 02 | .....];.....@.u. |
| 00000460 | C3 E9 98 02 00 00 68 38 15 40 00 E8 8B 04 00 00 | ......h8.@......|
| 00000470 | A1 68 33 40 00 C7 04 24 34 30 40 00 FF 35 64 33 | .h3@...$40@..5d3 |
| 00000480 | 40 00 A3 34 30 40 00 68 24 30 40 00 68 28 30 40 | @..40@.h$0@.h(0@ |
| 00000490 | 00 68 20 30 40 00 FF 15 94 20 40 00 83 C4 14 A3 | .h 0@.... @.....|
| 000004A0 | 30 30 40 00 85 C0 79 08 6A 08 E8 A5 03 00 00 59 | 00@...y.j......Y |
| 000004B0 | C3 6A 10 66 A8 21 40 00 E8 13 06 00 00 33 DB 39 | .j.f.!@......3.9 |
| 000004C0 | 1D 84 33 40 00 75 0B 53 E8 6A 01 53 FF 15 2C 20 | ..3@.u.S.j.S.., |
| 000004D0 | 40 00 89 5D FC 64 A1 18 00 00 00 8B 70 04 89 5D | @..].d......p..] |
| 000004E0 | E4 BF 78 33 40 00 53 56 57 FF 15 30 20 40 00 3B | ..x3@.SWV..0 @.; |
| 000004F0 | C3 74 19 3B C6 75 0B 33 F6 46 89 75 E4 EB 10 68 | .t.;.u.3.F.u...h |
| 00000500 | E8 03 00 00 FF 15 34 20 40 00 EB DA 33 F6 46 A1 | ......4 @...3.F. |
| 00000510 | 74 33 40 00 3B C6 75 C6 6A 1F E8 35 03 00 00 59 | t3@.;.u.j..5...Y |
| 00000520 | EB 3B A1 74 33 40 00 85 C0 75 2C 89 35 74 33 40 | .;.t3@...u,.5t3@ |

FIG. 3

```
2:         {
00401010  55                        push      ebp
00401011  8B EC                     mov       ebp, esp
00401013  81 EC A4 00 00 00         sub       esp, 0A4h
00401019  53                        push      ebx
0040101A  56                        push      esi
0040101B  57                        push      edi
0040101C  8D 8D 5C FF FF FF         lea       edi, [ebp-0a4h]
00401022  B9 29 00 00 00            mov       ecx, 29h
00401027  B8 CC CC CC CC            mov       eax, 0CCCCCCCCh
0040102C  F3 AB                     rep stos  dword ptr   [ edi ]
3:         char buffer[100];
4:         strcpy(buffer, argv[1]);
0040102E  8B 45 0C                  mov       ecx, dword ptr [ebp+0Ch]
00401031  8B 48 04                  mov       ecx, dword ptr [eax+4]
00401034  51                        push      ecx
00401035  8D 55 9C                  lea       ecx, [ebp-64h]
```

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00 | ADD Eb Gb | ADD Ev Gv | ADD Gb Eb | ADD Gv Ev | ADD AL Ib | ADD eAX Iv | PUSH ES | POP ES | OR Eb Gb | OR Ev Gv | OR Gb Eb | OR Gv Ev | OR AL Ib | OR eAX Iv | PUSH CS | TWOBYTE |
| 10 | ADC Eb Gb | ADC Ev Gv | ADC Gb Eb | ADC Gv Ev | ADC AL Ib | ADC eAX Iv | PUSH ES | POP ES | SBB Eb Gb | SBB Ev Gv | SBB Gb Eb | SBB Gv Ev | SBB AL Ib | SBB eAX Iv | PUSH DS | POP DS |
| 20 | AND Eb Gb | AND Ev Gv | AND Gb Eb | AND Gv Ev | AND AL Ib | AND eAX Iv | ES: | DAA | SUB Eb Gb | SUB Ev Gv | SUB Gb Eb | SUB Gv Ev | SUB AL Ib | SUB eAX Iv | CS: | DAS |
| 30 | XOR Eb Gb | XOR Ev Gv | XOR Gb Eb | XOR Gv Ev | XOR AL Ib | XOR eAX Iv | SS: | AAA | CMP Eb Gb | CMP Ev Gv | CMP Gb Eb | CMP Gv Ev | CMP AL Ib | CMP eAX Iv | DS: | ASS |
| 40 | INC eAX | INC eCX | INC eDX | INC eBX | INC eSP | INC eBP | INC eSI | INC eDI | DEC eAX | DEC eCX | DEC eDX | DEC eBX | DEC eSP | DEC eBP | DEC eSI | DEC eDI |
| 50 | PUSH eAX | PUSH eCX | PUSH eDX | PUSH eBX | PUSH eSP | PUSH eBP | PUSH eSI | PUSH eDI | POP eAX | POP eCX | POP eDX | POP eBX | POP eSP | POP eBP | POP eSI | POP eDI |
| 60 | PUSHA | POPA eCX | BOUND Gv Ma | ARPL Ew Gw | FS: | GS: | OPSIZE: | ADSIZE: | PUSH Iv | IMUL Gv Ev Iv | PUSH Ib | IMUL Gv Ev Ib | INSB Yb DX | UNSW Yz DX | OUTSB DX Xb | OUTSW DX Xv |
| 70 | JO Jb | JNO Jb | JB Jb | JNB Jb | JZ Jb | JNZ Jb | JBE Jb | JA Jb | JS Jb | JNS Jb | JP Jb | JNP Jb | JL Jb | JNL Jb | JLE Jb | JNLE Jb |

FIG. 5

| ADD Eb Ib 80 | ADD Ev Iv 81 | SUB Eb Ib 82 | SUB Ev Iv 83 | TEST Eb Gb 84 | TEST Ev Gv 85 | XCHG Eb Gb 86 | XCHG Ev Gv 87 | MOV Eb Gb 88 | MOV Ev Gv 89 | MOV Gb Eb 8A | MOV Gv Ev 8B | MOV Ew Sw 8C | LEA Gv M 8D | MOV Sw Ew 8E | POP Ev 8F |
|---|---|---|---|---|---|---|---|---|---|---|---|---|---|---|---|
| NOP 90 | XCHG eAX eCX 91 | XCHG eAX eDX 92 | XCHG eAX eBX 93 | XCHG eAX eSP 94 | XCHG eAX eBP 95 | XCHG eAX eSI 96 | XCHG eAX eDI 97 | CBW 98 | CWD 99 | CALL Ap 9A | WAIT 9B | PUSHF Fv 9C | POPF Fv 9D | SAHF 9E | LAHF 9F |
| MOV AL Ob A0 | MOV eAX Ov A1 | MOV Ob AL A2 | MOV Ov eAX A3 | MOVSB Xb Yb A4 | MOVSW Xv Yv A5 | CMPSB Xb Yb A6 | CMPSW Xv Yv A7 | TEST AL Ib A8 | TEST eAX Iv A9 | STOSB Yb AL AA | STOSW Yv eAX AB | LOCSB AL Xb AC | LODSW eAX Xv AD | SCASB AL Yb AE | SCASW eAX Yv AF |
| MOV AL Ib B0 | MOV CL Ib B1 | MOV DL Ib B2 | MOV BL Ib B3 | MOV AH Ib B4 | MOV CH Ib B5 | MOV DH Ib B6 | MOV BH Ib B7 | MOV eAX Iv B8 | MOV eCX Iv B9 | MOV eDX Iv BA | MOV eBX Iv BB | MOV eSP Iv BC | MOV eBP Iv BD | MOV eSI Iv BE | MOV eDI Iv BF |
| #2 BL Ib C0 | #2 Ev Ib C1 | RETN Iw C2 | RETN C3 | LES Gv Mp C4 | LDS Gv Mp C5 | MOV Eb Ib C6 | MOV Ev Iv C7 | ENTER Iw Ib C8 | LEAVE C9 | RETF Iw CA | RETF CB | INT3 CC | INT Ib CD | INTO CE | IRET CF |
| #2 Bb 1 D0 | #2 Ev 1 D1 | #2 Eb CL D2 | #2 Ev CL D3 | AAM Ib D4 | AAD Ib D5 | SALC D6 | XLAT D7 | ESC 0 D8 | ESC 1 D9 | ESC 2 DA | ESC 3 DB | ESC 4 DC | ESC 5 DD | ESC 6 DE | ESC 7 DF |
| LOOPNZ Jb E0 | LOOPZ Jb E1 | LOOP Jb E2 | JCXZ E3 | IN AL Ib E4 | IN eAX Ib E5 | OUT Ib AL E6 | OUT Ib eAX E7 | CALL Jz E8 | JMP Jz E9 | JMP Ap EA | JMP Jb EB | IN AL DX EC | IN eAX DX ED | OUT DX AL EE | OUT DX eAX EF |
| LOCK: F0 | INT1 F1 | REPNE: F2 | REP: F3 | HLT F4 | CMC F5 | #3 Eb F6 | #3 Ev F7 | CLC F8 | STC F9 | CLI FA | STI FB | CLD FC | STD FD | #4 INC/DEC FE | #5 INC/DEC FF |

FIG. 6

| LABEL | SIGNING OR LINK DATE | IP ADDRESS | HOST NAME | TRAINING DATA |
|---|---|---|---|---|
| 0 | 2020-07-31 12:00 | 1.1.1.1 | a.b.c.d | NORMAL_FILE.bmp ~910 |
| 1 | 2020-02-01 24:00 | 2.2.2.2 | w.x.y.z | APT.bmp |
| 2 | - | - | - | Backdoor.bmp |
| 3 | - | - | - | Bankler.bmp |
| 4 | - | - | - | Bot.bmp |
| 5 | - | - | - | Miner.bmp |
| 6 | - | - | - | Ransomware.bmp |
| 7 | - | - | - | RemoteAdminTool.bmp |
| 8 | - | - | - | Spyware.bmp |
| 9 | - | - | - | Trojan.bmp |
| 10 | - | - | - | Generic.bmp |

FIG. 9

APPARATUS FOR DETECTING UNKNOWN MALWARE USING VARIABLE OPCODE SEQUENCE AND METHOD USING THE SAME

CROSS REFERENCE TO RELATED APPLICATIONS

This application claims the benefit of Korean Patent Application No. 10-2020-0142203, filed Oct. 29, 2020, and No. 10-2021-0060608, filed May 11, 2021, which are hereby incorporated by reference in their entireties into this application.

BACKGROUND OF THE INVENTION

1. Technical Field

The present invention relates generally to technology for detecting malware, and more particularly to technology for detecting unknown malware using AI by processing information about an operation code (opcode), which is an instruction code that is used when static or dynamic analysis is performed on malware.

2. Description of the Related Art

In a conventional method, malware is detected based on a mechanism (signature-based detection) of determining whether a suspected malware file matches pattern information of a specific code section of malware. Particularly, because a conventional antivirus detection technique detects malware based on byte information of a specific code section used by malware or determines whether or not a file is malicious based on information about the structure of the file and on various kinds of log information (information about a DLL, a call of an API function, and the like), which are generated when malware is dynamically executed, it is limitedly able to detect new malware or new variants thereof.

Accordingly, various static and dynamic techniques for analysis of malware have recently been proposed, and attempts to effectively analyze and detect various types of malware including unknown files are ongoing, but it is difficult to release such techniques to the public due to the accuracy and performance limitations thereof.

Documents of Related Art (Patent Document 1) Korean Patent No. 10-1880686, registered on Jul. 16, 2018 and titled "Malware code detection system based on AI deep-learning".

SUMMARY OF THE INVENTION

An object of the present invention is to provide unknown-malware detection technology based on AI, the detection accuracy and performance of which can be improved.

Another object of the present invention is to provide malware detection technology capable of classifying and detecting unknown malware based on feature information characterized by the variable length thereof.

A further object of the present invention is to provide malware detection technology that can also be applied to detection of a document-type or script-type malware file.

In order to accomplish the above objects, a method for detecting unknown malware according to the present invention includes collecting operation code (opcode) information from a detection target; generating a multi-pixel image having a variable length by performing feature engineering on the opcode information; and detecting unknown malware by inputting the multi-pixel image to a deep-learning model based on AI.

Here, the multi-pixel image may correspond to a multi-pixel RGB image based on an n-gram corresponding to the opcode information.

Here, generating the multi-pixel image may include storing n-gram sequences for hexadecimal (hex) codes having a variable length based on the opcode information; and mapping a 3-gram of opcodes to an RGB code based on the n-gram sequences, thereby generating the multi-pixel RGB image.

Here, collecting the opcode information may include extracting a text section from an executable file corresponding to the detection target; converting raw data in the text section to opcodes in an assembly language format using a binary analysis tool; and extracting the hex codes based on the opcodes.

Here, detecting the unknown malware may be configured to detect the unknown malware in consideration of the similarity between feature information of each type of malware classified through training and multi-pixel feature information output from the deep-learning model.

Here, the method may further include generating a multi-pixel image corresponding to malware based on opcode information collected based on the malware and generating training data so as to correspond to the multi-pixel image corresponding to the malware; and training the deep-learning model using the training data.

Here, training the deep-learning model may be configured to acquire at least one of information about entropy of each piece of malware, the original creation date thereof, the final update date thereof, and information about a website via which the malware is distributed and to use the acquired information as the training data.

Here, the opcode may be a code for providing at least one function, among a logical operation, program flow control, memory manipulation, and an arithmetic operation.

Here, the opcode may correspond to an opcode in the assembly language format in a one-to-one manner.

Here, the opcode may include a 1-byte or 2-byte instruction and multiple operand values.

Also, an apparatus for detecting unknown malware according to an embodiment of the present invention includes a processor for collecting operation code (opcode) information from a detection target, generating a multi-pixel image having a variable length by performing feature engineering on the opcode information, and detecting unknown malware by inputting the multi-pixel image to a deep-learning model based on AI; and memory for storing the opcode information and the multi-pixel image.

Here, the multi-pixel image may correspond to a multi-pixel RGB image based on an n-gram corresponding to the opcode information.

Here, the processor may be configured to store n-gram sequences for hexadecimal (hex) codes having a variable length based on the opcode information; and to map a 3-gram of opcodes to an RGB code based on the n-gram sequences, thereby generating the multi-pixel RGB image.

Here, the processor may be configured to extract a text section from an executable file corresponding to the detection target; to convert raw data in the text section to opcodes in an assembly language format using a binary analysis tool; and to extract the hex codes based on the opcodes.

Here, the processor may be configured to detect the unknown malware in consideration of the similarity between feature information of each type of malware classified through training and multi-pixel feature information output from the deep-learning model.

Here, the processor may be configured to generate a multi-pixel image for training using opcode information collected based on multiple pieces of benign code and multiple pieces of malware; to generate training data so as to correspond to the multi-pixel image for training; and to train the deep-learning model using the training data.

Here, the processor may be configured to acquire at least one of information about entropy of each piece of malware, the original creation date thereof, the final update date thereof, and information about a website via which the malware is distributed, and to use the acquired information as the training data.

Here, the opcode may be a code for providing at least one function, among a logical operation, program flow control, memory manipulation, and an arithmetic operation.

Here, the opcode may correspond to an opcode in the assembly language format in a one-to-one manner.

Here, the opcode may include a 1-byte or 2-byte instruction and multiple operand values.

BRIEF DESCRIPTION OF THE DRAWINGS

The above and other objects, features, and advantages of the present invention will be more clearly understood from the following detailed description taken in conjunction with the accompanying drawings, in which:

FIG. 3 is a view illustrating an example of the structure of an executable file according to the present invention;

FIGS. 5 to 6 are views illustrating an example of hexadecimal (hex) codes according to the present invention;

FIGS. 9 to 11 are views illustrating an example of the process of classifying malware according to the present invention;

DESCRIPTION OF THE PREFERRED EMBODIMENTS

Figure 1:
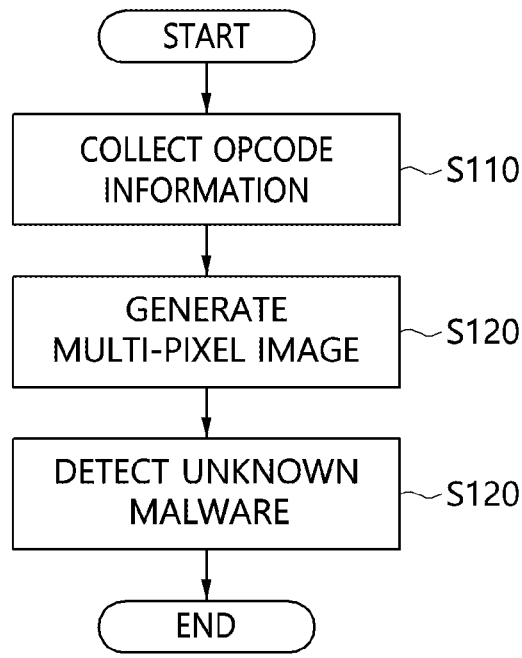
FIG. 1 is a flowchart illustrating a method for detecting unknown malware using a variable-length operation code (opcode) according to an embodiment of the present invention.

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a flowchart illustrating a method for detecting unknown malware using a variable-length operation code (opcode) according to an embodiment of the present invention.

Referring to FIG. 1, in the method for detecting unknown malware using a variable-length operation code according to an embodiment of the present invention, operation code (opcode) information is collected from a detection target at step S110.

Figure 2:
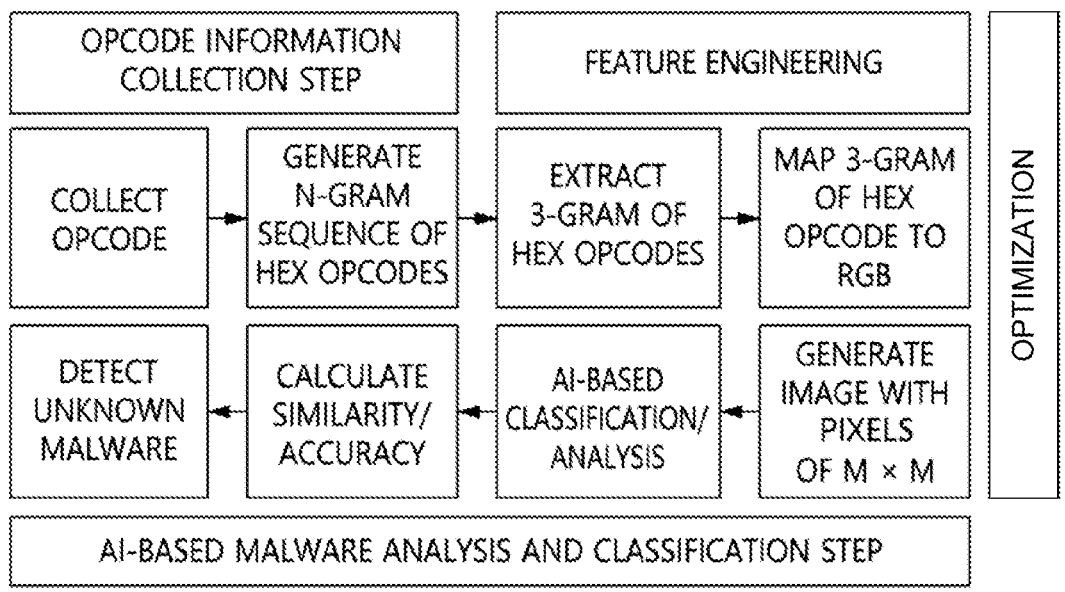
FIG. 2 is a view illustrating an example of the process of detecting malware according to the present invention.

For example, as illustrated in FIG. 2, the present invention may be broken up into an opcode-based information collection step for preprocessing training data based on AI, a feature information optimization step for performing feature engineering on collected information, and a malware analysis and classification step through which multi-class classification can be performed based on resultant feature information. Here, step S110 may correspond to the information collection step.

Here, a text section may be extracted from an executable file corresponding to the detection target.

Here, raw data in the text section may be converted into opcodes in an assembly language format using a binary analysis tool.

Here, in order to extract opcodes for static or dynamic analysis of malware, any of various binary analysis tools (disassemblers) may be used. Particularly, using an analysis tool, such as IDA, objdump, OllyDbg, Visual Studio, PE Explorer, or the like, depending on the OS of the analysis system, opcodes may be extracted using a static method. Also, when dynamic analysis is performed, opcodes of an executable file may be extracted and converted using a CPU or using a processor tracer or the like, even in a virtualized environment.

Figure 4:
FIG. 4 is a view illustrating an example of an operation code according to the present invention.

Here, the text section of an executable file (a PE, a DLL, or the like) may be extracted using any of various binary analysis tools. For example, raw data present in SECTION_text in a Portable Executable (PE) file, like what is illustrated in FIG. 3, may be converted into opcodes in an assembly language format, as shown in FIG. 4.

Here, reverse engineering based on general binary analysis is a manual method, and refers to all of various types of static/dynamic information, such as the type of a file, the size thereof, header information thereof, a certificate, the internal structure of the file, a registry, a network operation, information about a relevant API function, and the like, but the present invention fundamentally uses only opcodes, which are operation codes that occur when static/dynamic analysis is performed.

Also, in the case of packed or obfuscated malware, it is necessary to decode or deobfuscate the same in advance such that opcodes can be collected therefrom, but this part will not be described in detail because it does not form part of the gist of the present invention.

Here, an opcode according to the present invention is a machine-language instruction processed by a CPU, and may provide functions of a logical operation, program flow control, memory manipulation, or an arithmetic operation. Particularly, each opcode has a characteristic in that it exactly corresponds to a corresponding assembly language instruction in a one-to-one manner. The structure of such an opcode may include a 1-byte or 2-byte instruction (opcode) and multiple operand values.

For example, referring to FIG. 4, opcodes, such as mov, add, push, lea, call, and the like, may include operands indicating a register, such as ebx, eax, ecx, or the like, an actual value, and a reference value, and particularly, the number of operands and a code number may be different depending on the format of the instruction. That is, even if the opcode is the same, different results may be produced depending on the operands.

In the present invention, in order to find semantics having such characteristics, hexadecimal (hex) code values of opcodes (Intel's X86 Opcode and Instruction Reference) are used.

Here, hexadecimal codes may be extracted based on the opcodes.

Also, in the method for detecting unknown malware using a variable-length opcode according to an embodiment of the present invention, feature engineering is performed on the opcode information, whereby a multi-pixel image having a variable length is generated at step S120.

Here, step S120 may correspond to the information-processing and optimization step illustrated in FIG. 2.

Here, the multi-pixel image may be a multi-pixel RGB image based on an n-gram corresponding to the opcode information.

Here, based on the opcode information, an n-gram sequence of hexadecimal codes having a variable length may be stored.

For example, when the hex code values of the opcodes are extracted at the opcode-based information collection step illustrated in FIG. 2, 256 hex code values corresponding to the variable-length opcodes may be extracted from each executable file, as shown in FIGS. 5 to 6 and Table 1.

TABLE 1

| Group | Opcode |
| --- | --- |
| arithmetic operations | add, sub, mul, div |
| memory manipulation | lea, pop, push, mov, store, load |
| logical operations | xor, not, and, or |
| program flow control | call, cmp, rep |
| conditional operation | goto, jmp, if, spa, sna, sza |

Figure 7:
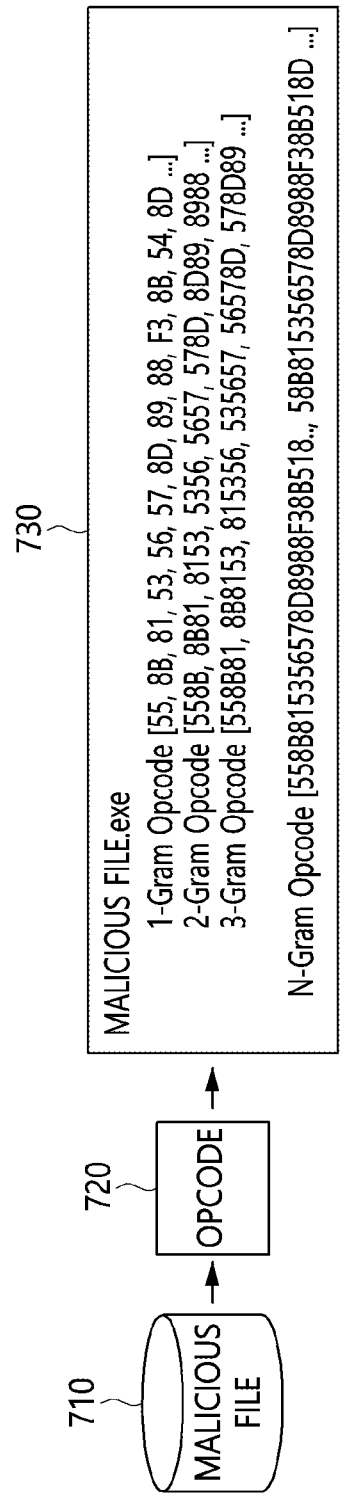
FIG. 7 is a view illustrating an example of the process of generating an n-gram sequence according to the present invention.

Here, referring to FIG. 7, a 1-gram (unigram), a 2-gram (bigram), a 3-gram (trigram), . . . , an n-gram of hex code values may be separately stored in order to perform n-gram sequence analysis on the hex code values. That is, a variable-length n-gram sequence of hex opcodes 730 may be stored.

Here, based on the n-gram sequences, a 3-gram of opcodes is mapped to an RGB code, whereby a multi-pixel image may be generated.

Figure 8:
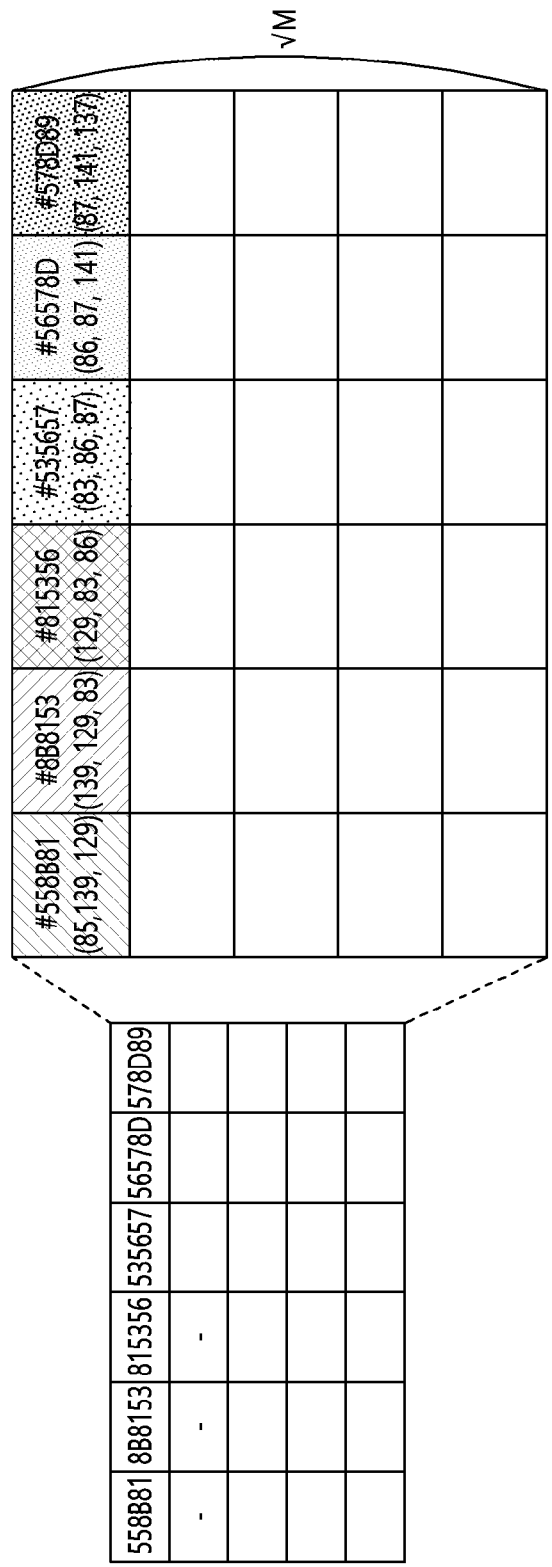
FIG. 8 is a view illustrating an example of the process of generating a multi-pixel RGB image according to the present invention.

For example, a 1-gram sequence of opcodes may be converted to a grayscale image, and a 2-gram of opcodes may be converted into X and Y coordinates to be used as location information in a plane. Here, a 3-gram sequence of opcode information may be converted to an image having pixels of M×M (jpg, png, bmp, or the like) through RGB code mapping, as illustrated in FIG. 8. Here, M may be proportional to the square root of the average number of 3-grams in a 3-gram sequence of malicious or benign code to be used for AI learning.

If 3-gram sequences respectively generated from one hundred thousand pieces of malware include 900 3-grams on average, an image having pixels of 30×30 pixels may be generated. Here, when the number of 3-grams in a 3-gram sequence of malware is less than the average, zero padding is added, and appears black pixels when the 3-gram sequence is converted into an image. Also, when the number of 3-grams in a 3-gram sequence of malware is equal to or greater than the average, control may be performed such that only a number of 3-grams equal to the average, among all of the 3-grams in the 3-gram sequence, are converted into an image.

Here, the format of the resultant image may take any of various formats, such as jpg, png, gif, bmp, and the like.

Also, in the method for detecting unknown malware using a variable-length operation code according to an embodiment of the present invention, the multi-pixel image is input to a deep-learning model based on AI, whereby unknown malware is detected at step S130.

Here, step S130 may correspond to an unknown malware detection step in the step of analyzing and classifying malware based on AI, illustrated in FIG. 2.

Here, in the present invention, the deep-learning model based on AI may be trained in advance using training data generated for each type of malware, and a description thereof will be made later with reference to Table 2.

Figure 10:
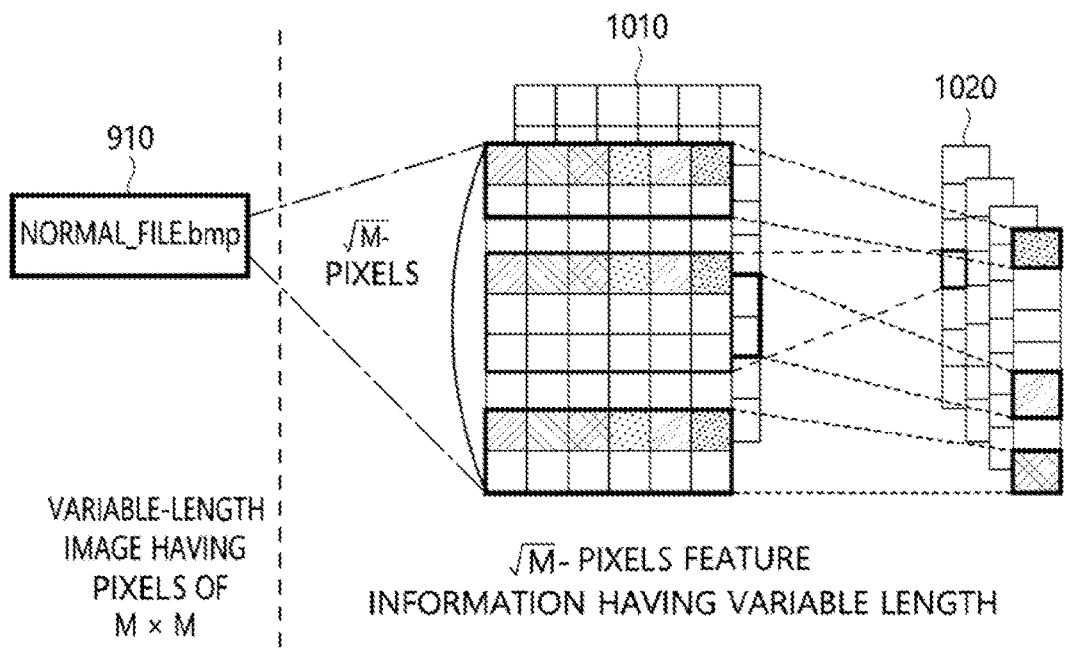
Figure 11:
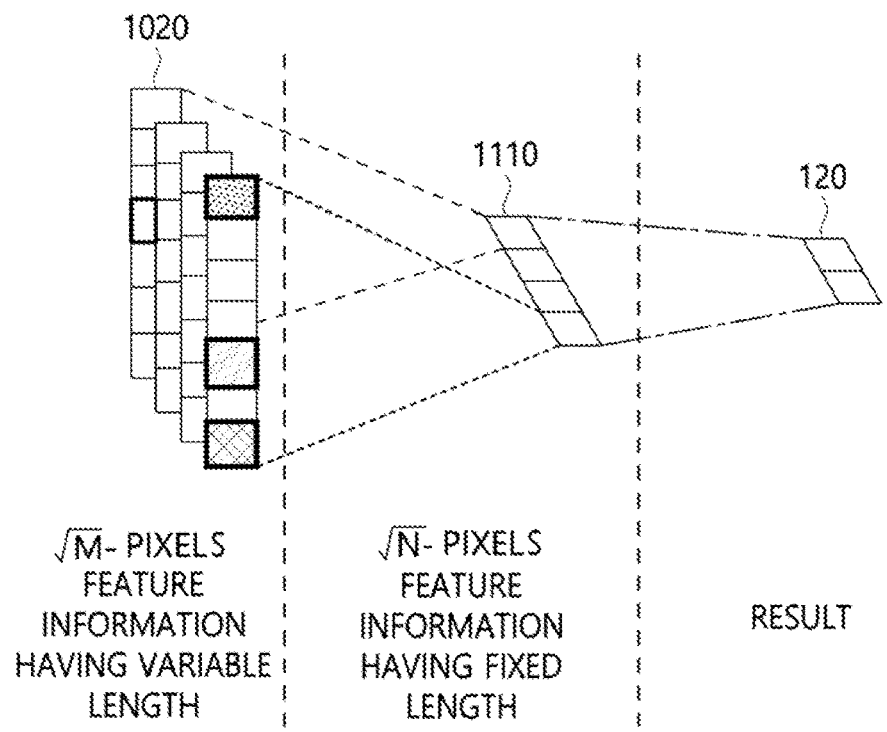

For example, the deep-learning model according to an embodiment of the present invention may correspond to a model based on a Convolutional Neural Network (CNN), as illustrated in FIGS. 9 to 11. Such a CNN-based model has a characteristic in that it is able to process input having a variable length. When generated feature information has a size less than a preset size, meaningless zero padding may be added thereto, whereas when the generated feature information has a size greater than the preset size, the CNN-based model may prevent a learning error, which may occur due to some discarded information.

Here, unknown malware may be detected based on the similarly between feature information of each type of malware classified through training and multi-pixel feature information output from the deep-learning model.

For example, when the similarity between feature information of each type of malware classified through training and multi-pixel feature information output from the deep-learning model is equal to or greater than a preset similarity, it may be determined that the detection target is unknown malware. That is, when the detection target includes feature information that is not the same as that of previously classified malware but similar thereto, it may be determined that the detection target is a new unknown malware variant.

Here, in consideration of the similarity between feature information of each type of malware classified through training and the multi-pixel feature information output from the deep-learning model, malware of a previously classified type may also be detected.

For example, it may be assumed that the multi-pixel feature information output from the deep-learning model is X and that A, B and C are present as feature information for respective types of malware classified through training. Here, the multi-pixel feature information X may be compared with each of A, B, and C in order to determine the similarity therebetween.

If the similarity between X and A is equal to or greater than a preset reference, X may be determined to be malware corresponding to the feature information A.

Also, although not illustrated in FIG. 1, in the method for detecting unknown malware using a variable-length operation code according to an embodiment of the present invention, a multi-pixel image for training is generated using opcode information collected based on multiple pieces of benign code and multiple pieces of malware, and training data is generated so as to correspond to the multi-pixel image for training.

Also, although not illustrated in FIG. 1, in the method for detecting unknown malware using a variable-length operation code according to an embodiment of the present invention, the deep-learning model is trained using the training data.

For example, training data corresponding to malicious or benign code is labeled with a malware type that is classified in advance, and is then used as training data for the deep-learning model based on AI.

Here, because the criteria for classifying malware into each type are different for respective anti-virus vendors, the classification of types is not uniform, and the criteria used for labeling for training may also be variable. For example, Table 2 shows an example of labelling for classifying malware into ten types when training data in the form of an image is generated.

TABLE 2

| type | class | label | description |
|---|---|---|---|
| PE | Benign | 0 | normal file |
| | APT | 1 | malware group used in advanced persistent threat (APT)-related attack |
| | Backdoor | 2 | malware group known as backdoor |
| | Banker | 3 | malware group known as Banker (finance information theft) |
| | Bot | 4 | malware group known as Bot (C&C communication) |
| | Miner | 5 | malware (or tool) group related to Bitcoin mining |
| | Ransomware | 6 | malware group known as ransomware |
| | RAT | 7 | malware group known as remote admin tool |
| | Spyware | 8 | malware group known as spyware |
| | Trojan | 9 | malware group known as trojan horses |
| | ETC | 10 | other malware groups |

Here, in the case of malware sample data for training that is classified based on various criteria (criteria of other vaccine vendors, VirusTotal, and the like), other than the criteria used for classification into the classes listed in Table 2, a multi-pixel image may be generated based on information (a vaccine name, whether malware is detected, a version, a detection name result, an update date, and the like) detected by each vendor in response to a specific malware file or a hash value, and may then be applied to various AI technologies, such as the CNN-based model illustrated in FIGS. 9 to 11, whereby detection and classification of malware may be performed.

Here, at least one of information about entropy (randomness) of each piece of malware, the original creation date thereof, the final update date thereof, and information about the website via which the malware is distributed may be acquired and used as training data.

For example, information about entropy of specific malware, the original creation date thereof, the final update date thereof, and information about the website (IP address or domain) via which the specific malware is distributed over the Internet may be additionally acquired at the step of optimizing the m-pixel feature information based on a 3-gram, illustrated in FIG. 2.

Also, in the present invention, the various n-gram sequences of opcodes that are separately stored at the optimization step illustrated in FIG. 2 may be used for various AI technologies. Also, assembly-language-based opcodes are extracted not only from executable files (a PE, a DLL, and the like) but also from various document-type and script-type malware files based on respective forensic tools, whereby the malware detection method proposed in the present invention may be applied. Particularly, even when executable code or a script is nested within a document-type file, the method proposed by the present invention may be applied.

Through the above-described method for detecting unknown malware, detection accuracy and performance of technology for detecting unknown malware based on AI may be improved.

Also, malware detection technology capable of classifying and detecting unknown malware based on feature information characterized by the variable length thereof may be provided.

Also, malware detection technology that can also be applied to detection of a document-type or script-type malware file may be provided.

Figure 12:
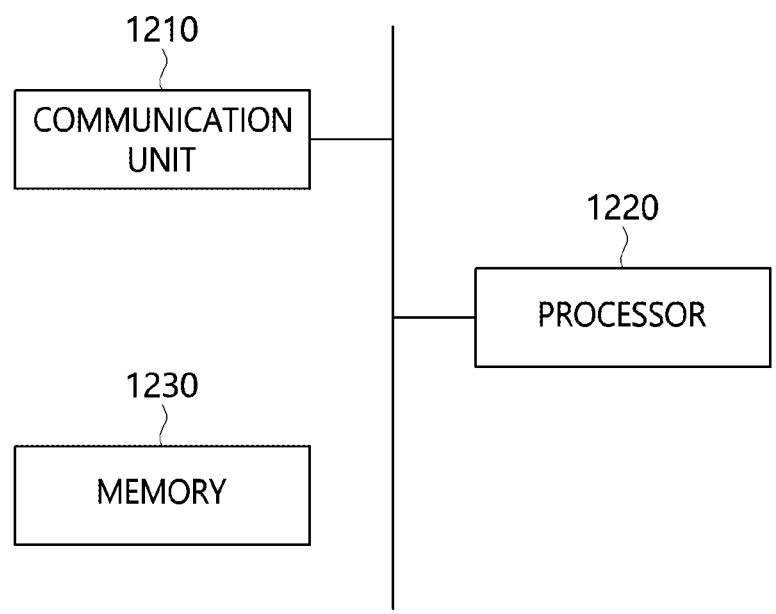
FIG. 12 is a block diagram illustrating an apparatus for detecting unknown malware using a variable-length operation code according to an embodiment of the present invention.

FIG. 12 is a block diagram illustrating an apparatus for detecting unknown malware using a variable-length operation code according to an embodiment of the present invention.

Referring to FIG. 12, the apparatus for detecting unknown malware using a variable-length operation code according to an embodiment of the present invention includes a communication unit 1210, a processor 1220, and memory 1230.

The communication unit 1210 may serve to transmit and receive information required for detection of unknown malware through a communication network. Here, the network provides a path via which data is delivered between devices, and may be conceptually understood to encompass networks that are currently being used and networks that have yet to be developed.

For example, the network may be an IP network, which provides service for transmission and reception of a large amount of data and uninterrupted data service through an Internet Protocol (IP), an all-IP network, which is an IP network structure that integrates different networks based on IP, or the like, and may be configured as a combination of one or more of a wired network, a Wireless Broadband (WiBro) network, a 3G mobile communication network including WCDMA, a 3.5G mobile communication network including a High-Speed Downlink Packet Access (HSDPA) network and an LTE network, a 4G mobile communication network including LTE advanced, a satellite communication network, and a Wi-Fi network.

Also, the network may be any one of a wired/wireless local area network for providing communication between various kinds of data devices in a limited area, a mobile communication network for providing communication between mobile devices or between a mobile device and the outside thereof, a satellite communication network for providing communication between earth stations using a satellite, and a wired/wireless communication network, or may be a combination of two or more selected therefrom. Meanwhile, the transmission protocol standard for the network is not limited to existing transmission protocol standards, but may include all transmission protocol standards to be developed in the future.

The processor 1220 collects operation code (opcode) information from a detection target.

Also, the processor 1220 generates a multi-pixel image having a variable length by performing feature engineering on the opcode information.

Here, the multi-pixel image may be a multi-pixel RGB image based on an n-gram corresponding to the opcode information.

Here, the n-gram sequences of hexadecimal codes having a variable length are stored based on the opcode information, and the 3-gram of opcodes is mapped to an RGB code based on the n-gram sequence, whereby the multi-pixel RGB image may be generated.

Here, a text section is extracted from an executable file, corresponding to the detection target, raw data in the text section is converted to opcodes in an assembly language format using a binary analysis tool, and the hex codes may be extracted based on the opcode.

Here, the opcode may be a code for providing at least one function, among a logical operation, program flow control, memory manipulation, and an arithmetic operation.

Here, the opcode may correspond to the opcode in an assembly language format in a one-to-one manner.

Here, the opcode may be configured with a 1-byte or 2-byte instruction and multiple operand values.

Also, the processor 1220 inputs the multi-pixel image to a deep-learning model based on AI, thereby detecting unknown malware.

Here, unknown malware may be detected in consideration of the similarity between feature information of each type of malware classified through training and multi-pixel feature information output from the deep-learning model.

Also, the processor 1220 may generate a multi-pixel image for training using opcode information collected based on multiple pieces of benign code and multiple pieces of malware, generate training data so as to correspond to the multi-pixel image for training, and train the deep-learning model using the training data.

Here, at least one of information about entropy of each piece of malware, the original creation date thereof, the final update date thereof, and information about a website via which the malware is distributed may be acquired and used as the training data.

The memory 1230 stores the opcode information and the multi-pixel image.

Also, the memory 1230 stores various kinds of information generated in the above-described apparatus for detecting unknown malware according to an embodiment of the present invention.

According to an embodiment, the memory 1230 may be separate from the apparatus for detecting unknown malware, and may support the function for detecting unknown malware. Here, the memory 1230 may operate as separate mass storage, and may include a control function for performing operations.

Meanwhile, the apparatus for detecting unknown malware includes memory installed therein, whereby information may be stored therein. In an embodiment, the memory is a computer-readable medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard-disk device, an optical disk device, or any other kind of mass storage device.

Using the above-described apparatus for detecting unknown malware, detection accuracy and performance of technology for detecting unknown malware based on AI may be improved.

Also, malware detection technology capable of classifying and detecting unknown malware based on feature information characterized by the variable length thereof may be provided.

Also, malware detection technology that can also be applied to detection of a document-type or script-type malware file may be provided.

Figure 13:
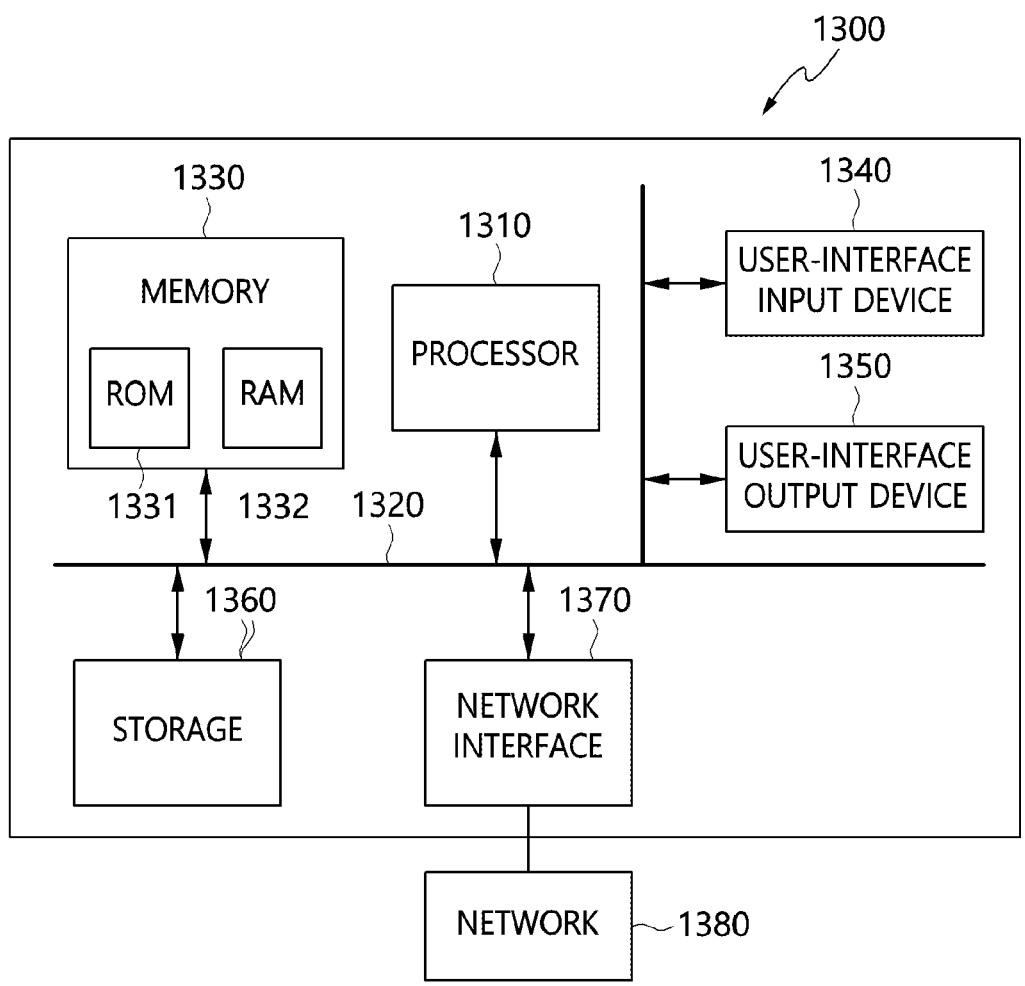
FIG. 13 is a view illustrating a computer system according to an embodiment of the present invention.

FIG. 13 is a view illustrating a computer system according to an embodiment of the present invention.

Referring to FIG. 13, an embodiment of the present invention may be implemented in a computer system including a computer-readable recording medium. As illustrated in FIG. 13, the computer system 1300 may include one or more processors 1310, memory 1330, a user-interface input device 1340, a user-interface output device 1350, and storage 1360, which communicate with each other via a bus 1320. Also, the computer system 1300 may further include a network interface 1370 connected to a network 1380. The processor 1310 may be a central processing unit or a semiconductor device for executing processing instructions stored in the memory 1330 or the storage 1360. The memory 1330 and the storage 1360 may be any of various types of volatile or nonvolatile storage media. For example, the memory may include ROM 1331 or RAM 1332.

Accordingly, an embodiment of the present invention may be implemented as a nonvolatile computer-readable storage medium in which methods implemented using a computer or instructions executable in a computer are recorded. When the computer-readable instructions are executed by a processor, the computer-readable instructions may perform a method according to at least one aspect of the present invention.

According to the present invention, unknown-malware detection technology based on AI, the detection accuracy and performance of which can be improved, may be provided.

Also, the present invention may provide malware detection technology capable of classifying and detecting unknown malware based on feature information characterized by the variable length thereof.

Also, the present invention may provide malware detection technology that can also be applied to detection of a document-type or script-type malware file.

As described above, the apparatus for detecting unknown malware using a variable-length operation code and method using the apparatus according to the present invention are not limitedly applied to the configurations and operations of the above-described embodiments, but all or some of the embodiments may be selectively combined and configured, so that the embodiments may be modified in various ways.

What is claimed is:

1. A method for detecting unknown malware, comprising:
   collecting operation code (opcode) information from a detection target;
   generating a multi-pixel image having a variable length by performing feature engineering on the opcode information; and
   detecting unknown malware by inputting the multi-pixel image to a deep-learning model based on AI,
   wherein the multi-pixel image corresponds to a multi-pixel RGB image based on an n-gram corresponding to the opcode information, and
   wherein generating the multi-pixel image comprises:
      storing n-gram sequences for hexadecimal (hex) codes having a variable length based on the opcode information; and
      mapping a 3-gram of opcodes to an RGB code based on the n-gram sequences, thereby generating the multi-pixel RGB image.

2. The method of claim 1, wherein collecting the opcode information comprises:

extracting a text section from an executable file corresponding to the detection target;
converting raw data in the text section to opcodes in an assembly language format using a binary analysis tool; and
extracting the hex codes based on the opcodes.

3. The method of claim 1, wherein detecting the unknown malware is configured to detect the unknown malware in consideration of a similarity between feature information of each type of malware classified through training and multi-pixel feature information output from the deep-learning model.

4. The method of claim 1, further comprising:
generating a multi-pixel image for training using opcode information collected based on multiple pieces of benign code and multiple pieces of malware and generating training data based on the multi-pixel image for training; and
training the deep-learning model using the training data.

5. The method of claim 4, wherein training the deep-learning model is configured to acquire at least one of information about entropy of each piece of malware, an original creation date thereof, a final update date thereof, and information about a website via which the malware is distributed and to use the acquired information as the training data.

6. The method of claim 2, wherein the opcode is a code for providing at least one function, among a logical operation, program flow control, memory manipulation, and an arithmetic operation.

7. The method of claim 2, wherein the opcode corresponds to an opcode in the assembly language format in a one-to-one manner.

8. The method of claim 2, wherein the opcode includes a 1-byte or 2-byte instruction and multiple operand values.

9. An apparatus for detecting unknown malware, comprising:
a processor for collecting operation code (opcode) information from a detection target, generating a multi-pixel image having a variable length by performing feature engineering on the opcode information, and detecting unknown malware by inputting the multi-pixel image to a deep-learning model based on AI; and
memory for storing the opcode information and the multi-pixel image,
wherein the multi-pixel image corresponds to a multi-pixel RGB image based on an n-gram corresponding to the opcode information, and
wherein the processor is configured to:
store n-gram sequences for hexadecimal (hex) codes having a variable length based on the opcode information; and
map a 3-gram of opcodes to an RGB code based on the n-gram sequences, thereby generating the multi-pixel RGB image.

10. The apparatus of claim 9, wherein the processor is configured to:
extract a text section from an executable file corresponding to the detection target;
convert raw data in the text section to opcodes in an assembly language format using a binary analysis tool; and
extract the hex codes based on the opcodes.

11. The apparatus of claim 9, wherein the processor is configured to detect the unknown malware in consideration of a similarity between feature information of each type of malware classified through training and multi-pixel feature information output from the deep-learning model.

12. The apparatus of claim 9, wherein the processor is configured to:
generate a multi-pixel image for training using opcode information collected based on multiple pieces of benign code and multiple pieces of malware;
generate training data so as to correspond to the multi-pixel image for training; and
train the deep-learning model using the training data.

13. The apparatus of claim 12, wherein the processor is configured to:
acquire at least one of information about entropy of each piece of malware, an original creation date thereof, a final update date thereof, and information about a website via which the malware is distributed, and
use the acquired information as the training data.

14. The apparatus of claim 10, wherein the opcode is a code for providing at least one function, among a logical operation, program flow control, memory manipulation, and an arithmetic operation.

15. The apparatus of claim 10, wherein the opcode corresponds to an opcode in the assembly language format in a one-to-one manner.

16. The apparatus of claim 10, wherein the opcode includes a 1-byte or 2-byte instruction and multiple operand values.

* * * * *